(12) United States Patent
Ohki et al.

(10) Patent No.: US 7,626,634 B2
(45) Date of Patent: Dec. 1, 2009

(54) CAMERA STAND WITH CAMERA CHARGING MECHANISM

(75) Inventors: Yuji Ohki, Tokyo (JP); Atsushi Shigemura, Tokyo (JP); Masakazu Iwamoto, Tokyo (JP); Shuji Shibuki, Mitaka (JP)

(73) Assignee: Casio Computer Co., Ltd., Tokyo (JP)

( * ) Notice: Subject to any disclaimer, the term of this patent is extended or adjusted under 35 U.S.C. 154(b) by 507 days.

(21) Appl. No.: 10/922,277

(22) Filed: Aug. 19, 2004

(65) Prior Publication Data

US 2005/0040298 A1 Feb. 24, 2005

(30) Foreign Application Priority Data

Aug. 22, 2003 (JP) .............................. 2003-298844
Jun. 14, 2004 (JP) .............................. 2004-175716

(51) Int. Cl.
*H04N 5/225* (2006.01)
(52) U.S. Cl. ...................... 348/373; 348/207.1; 348/372
(58) Field of Classification Search ......... 348/370–376, 348/207.1, 221.14; 358/482, 513
See application file for complete search history.

(56) References Cited

U.S. PATENT DOCUMENTS

| | | | | |
|---|---|---|---|---|
| 5,374,971 A | * | 12/1994 | Clapp et al. ................. | 348/376 |
| 5,444,486 A | * | 8/1995 | Mizuno et al. ............... | 348/376 |
| 5,767,905 A | * | 6/1998 | Archambo .................. | 348/373 |
| 6,008,846 A | * | 12/1999 | Uehara et al. ............... | 348/373 |
| 7,050,106 B2 | * | 5/2006 | Nagano ....................... | 348/373 |
| 2003/0133013 A1 | * | 7/2003 | Maeda et al. ................ | 348/143 |

FOREIGN PATENT DOCUMENTS

| | | |
|---|---|---|
| CN | 1432861 A | 7/2007 |
| JP | 63-254868 A | 10/1988 |
| JP | 63254868 | * 10/1988 |
| JP | 08-084276 A | 3/1996 |
| JP | 08-111803 A | 4/1996 |
| JP | 2000-032315 A | 1/2000 |
| JP | 2001-069381 A | 3/2001 |
| JP | 2001-144997 A | 5/2001 |
| JP | 2002-281349 A | 9/2002 |
| JP | 2003-179782 A | 6/2003 |
| JP | 2003-209717 A | 7/2003 |

* cited by examiner

*Primary Examiner*—Lin Ye
*Assistant Examiner*—Gevell Selby
(74) *Attorney, Agent, or Firm*—Frishauf, Holtz, Goodman & Chick, P.C.

(57) ABSTRACT

A camera stand comprising a foot that will be placed a surface, a support having opposite ends at one of which the support is supported rotatably on the foot and turnable between a lying position and an upstanding position, an arm mechanism capable of attaching a digital camera removably at one end thereto and supported rotatably at the other end to the other end of the support such that in use the arm mechanism is adjusted in angle to the support so as to allow the camera to pick up an image of a picture/document placed under the camera while in non-use the arm mechanism is received within the confine of the support, which is then folded on the foot.

19 Claims, 18 Drawing Sheets

CAMERA STAND WITH CAMERA CHARGING MECHANISM

BACKGROUND OF THE INVENTION

The present invention relates to camera stands on each of which a digital camera is set for picking up an image of a picture/document.

One prior-art image pickup apparatus that picks up an image of a picture or document comprises an support arm upstanding at a rear end of a document rest on which a picture or document whose image should be picked up is placed with a dedicated electronic camera set on an upper end of the support arm (Japanese Patent Publication 2002-281349).

Since the above picture image pickup apparatus comprises the dedicated electronic camera, it is very expensive and inconvenient to carry because the support arm protrudes long upwards from the document stand.

SUMMARY OF THE INVENTION

According to the present invention, there is provided a camera stand comprising:
a foot that will be placed a surface;
a support with opposite ends at one of which the support is supported rotatably on the foot and turnable between a lying position and an upstanding position;
an arm mechanism with opposite ends at one of which the arm mechanism is capable of attaching a digital camera removably thereto and supported rotatably at the other end to the other end of the support such that in use the arm mechanism is adjusted in angle to the support so as to allow the camera to pick up an image of a picture/document placed under the camera while in non-use the arm mechanism is received within the confine of the support, which is then folded on the foot.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

Figure 1:
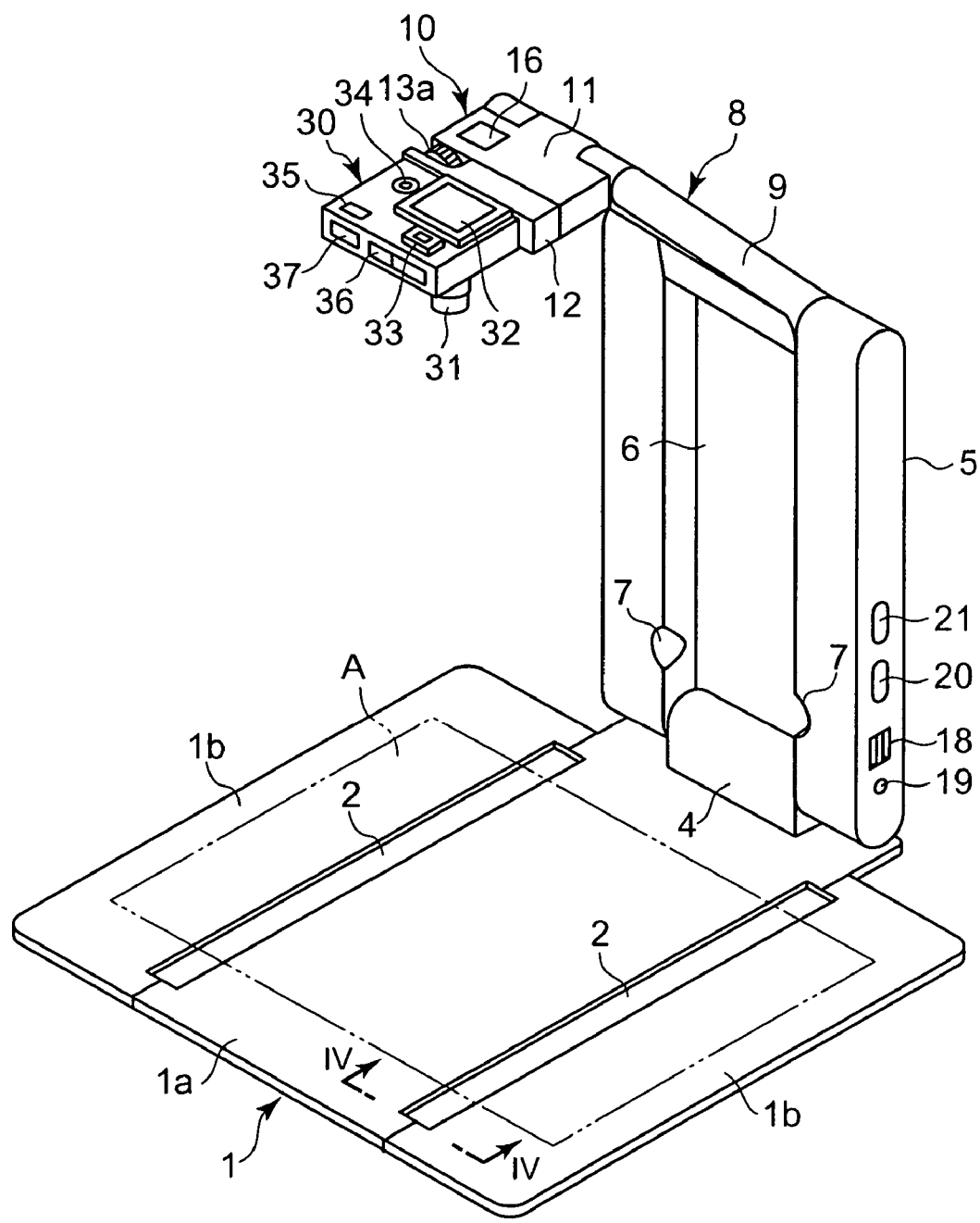
FIG. 1 is a perspective view of a camera stand of a first embodiment according to the present invention when it is in use.

The same reference numerals denote like parts of all embodiments of the present invention throughout all the accompanying drawings.

First Embodiment

Figure 2:
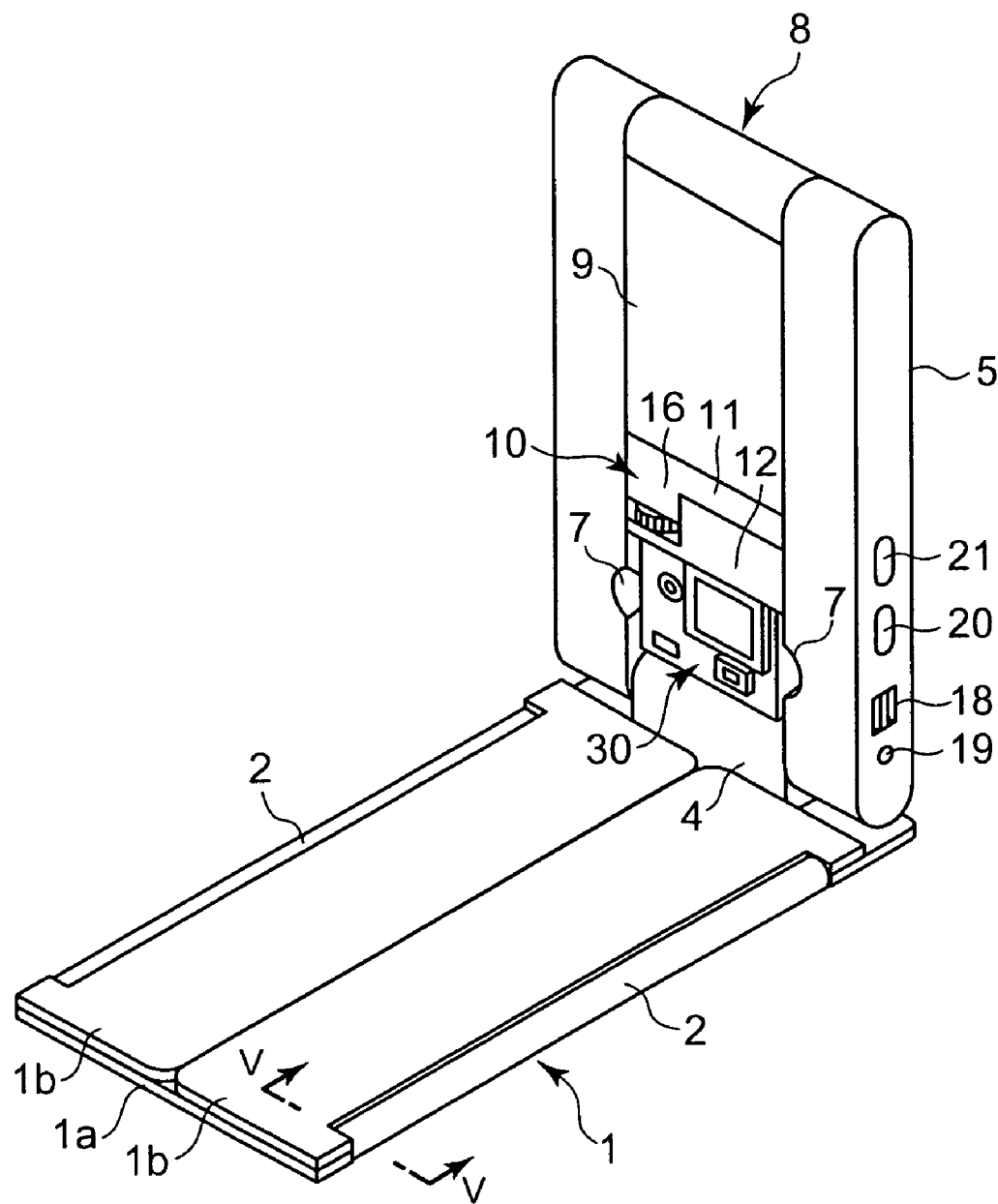
FIG. 2 is a perspective view of first embodiment in a folding state.
Figure 3:
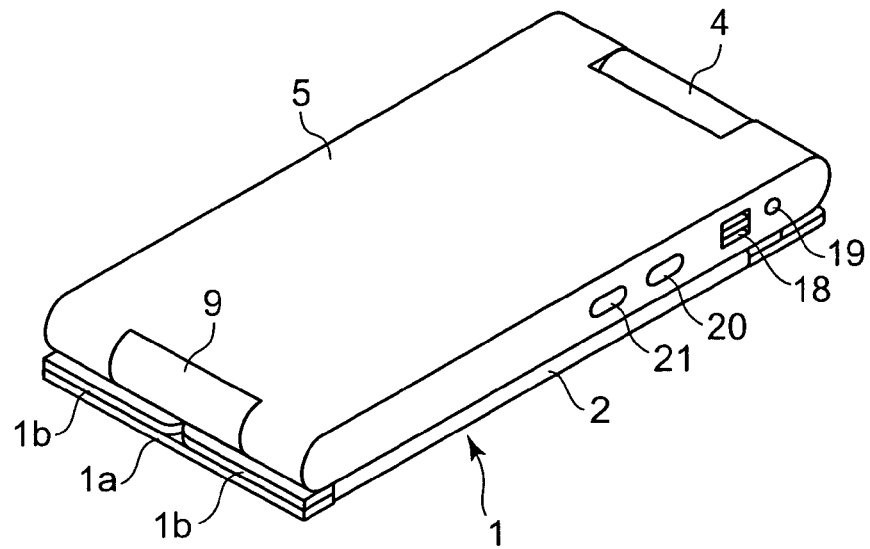
FIG. 3 is a perspective view of the first embodiment in a folded state.
Figure 4:
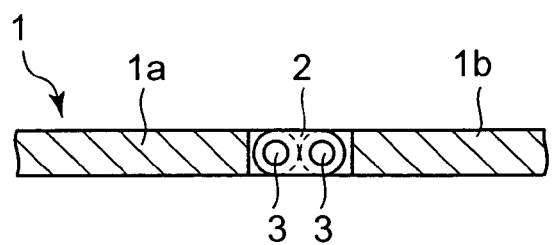
FIG. 4 is an enlarged cross-sectional view taken along a line IV-IV of FIG. 1.
Figure 5:
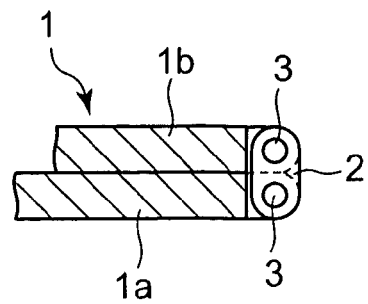
FIG. 5 is an enlarged cross-sectional view taken along a line V-V of FIG. 2.

FIGS. 1-8 illustrate a first embodiment of a camera stand according to the present invention. FIG. 1 is a perspective view of the first embodiment in use. FIG. 2 is a perspective view of the first embodiment in a folding state. FIG. 3 is a perspective view of the first embodiment in a folded state. FIG. 4 is an enlarged cross-sectional view taken along a line IV-IV of FIG. 1. FIG. 5 is an enlarged cross-sectional view taken along a line V-V of FIG. 2.

As shown in FIGS. 1-3, the camera stand comprises a foot 1 that will be placed, for example on a table as, a rectangular plate-like support 5 that is connected rotatably at a lower semicircular end by a pivot unit 4 to a rear end of the foot 1 and that has a central longitudinal rectangular recess 6 on its front (as viewed in FIG. 1), and an arm mechanism 8. The arm mechanism comprises a hollow rectangular camera holder 10 fixing a commercially available digital camera 30 removably to a forward end thereof and having a width somewhat greater than the camera, and an arm 9 that is connected rotatably at one end to the rear end of the camera holder 10 and supported rotatably at the other end by the other end of the support 5. The arm 5 also has a hollow body with a width equal to that of the camera holder 10.

When the camera stand is used, the support 5 is locked in an upstanding state or at a desired forwardly inclined angle to the plate-like foot 1, the arm 9 is set at an appropriate angle to the support 5, and the camera holder 10 is likewise set at an appropriate angle to the arm 9 such that the camera 30 can pick up a best image of a picture or document A placed on the foot 1 below the camera. When the camera stand is not used, the camera 30, holder 10 and arm 9 can be snugly received and arranged longitudinally within the recess 6 in the support 5, and the support 5 that has received the camera 30, holder 10 and arm 9 within the recess 6 can then be laid on the foot 1 (FIGS. 2 and 3) to thereby provide a compact block convenient for transportation.

The foot 1 comprises a central rectangular plate 1*a* and a pair of side plates 1*b* each of which is connected turnably to a respective one of both the sides of the central plate 1*a* by a rod-like hinge 2 housed in a cut formed between the central plate 1*a* and that side plate in such a manner that two pivots 3 extending outwards axially from each end of the hinge 2 are received in the central plate 1*a* and that side plate 1*b* through the corresponding cut ends, as shown in FIGS. 4 and 5. Each side plate 1*b* has a width equal to a half of that of the central plate 1*a* and a length somewhat shorter than the central plate 1*a*. Each side plate 1*b* can be extended so as to share the same plane as the central plate 1*a* and folded on the central plate.

The central and side plates 1*a* and 1*b* of the foot or picture/document rest 1 are made of hard plastic and have a thickness of approximately 1-2 mm. As shown in FIGS. 4 and 5, the hinge 2 that has the same thickness as the plates 1*a* and 1*b* and a width equal to twice that of the thickness of the plates 1*a* and 1*b*.

The central plate 1*a* has substantially the same configuration as the support 5. The central plate 1*a* and the pair of side plates 1*b* have aligned forward edges.

When the pair of side plates 1*b* are unfolded from over the corresponding sides of the central plate 1*a*, as shown in FIG. 1, the whole document rest 1 has a size larger somewhat than an A4-size (210×297 mm) picture/document placed thereon such that the shorter sides of the A4 size are parallel to the rod-like hinges 2.

The pivot unit 4 of the support 5 is at such a height that the support 5 is folded and laid horizontally just on the pair of side plates 1*b*, which have been folded on the central plate 1*a*, as shown in FIG. 3 which illustrates the camera stand in non-use or transportation.

A latch mechanism (not shown) is provided at the end of the arm 9 near the support 5 such that the arm 9 can be locked at a selected one of a plurality of different angles to the support 5 in front of the support 5 or in a state in which the support 5 that completely receives the arm 9 within the recess 6 in the support 5 is laid horizontally on the document rest 1. Also, a second latch (not shown) is provided at the end of the turning member 11 near the arm 9 such that the turning member 11 can be locked at a selected one of a plurality of different angles to the arm 9 or in a state in which the turning member 11 extends in the same direction as the arm 9.

Figure 6:
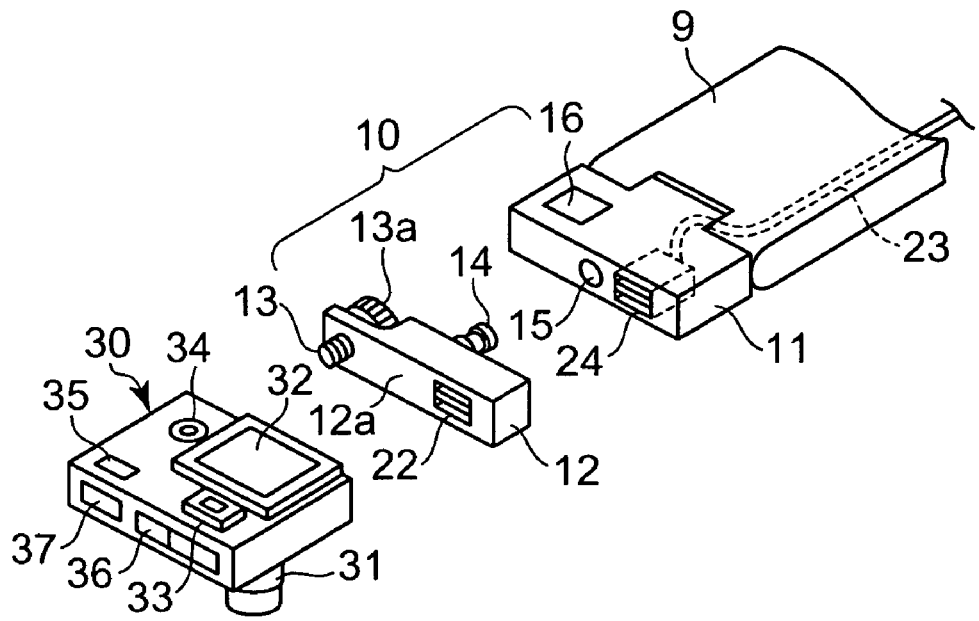
FIG. 6 is a perspective view of a turning member and a fixing member of a camera holder of the first embodiment and a digital camera put in a decomposed state.
Figure 7:
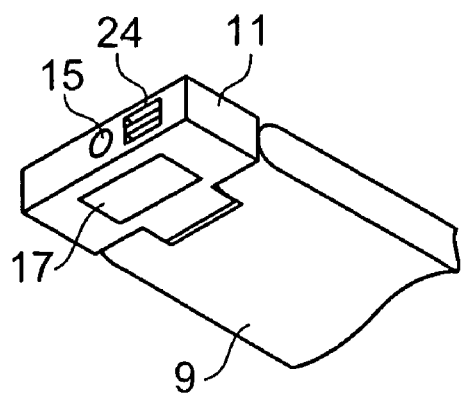
FIG. 7 is a perspective view of the turning member of the first embodiment as viewed from its bottom side.

FIG. 6 is a perspective decomposed view of the turning member 11 and an I-like camera fixing member 12 of the camera holder 10 and the digital camera 30 attachable to the camera holder 10. FIG. 7 is a perspective view of the turning member 11 and the arm 9 as viewed from its bottom side.

As shown in FIGS. 6 and 7, the turning member 11 of the camera holder 10 comprises a rectangular block having substantially the same width and thickness as the arm 9 and having a central rear protrusion received within a cut formed on a forward end of the arm 9 so as to be rotatable around a pivot (not shown) extending widthwise through the rear protrusion of the turning member 11 and the cut in the forward end of the arm 9.

As shown in FIG. 6, the camera fixing member 12 of the camera holder 10 is in the form of an I that has substantially the same width and thickness as the turning member 11. A front end 12*a* of the camera fixing member 12 is adapted to be fixed to the bottom of the camera 30 by screwing a screw 13 (whose head is shown by 13*a*) through a thinned end part of the fixing member 12 into a tripod attaching screwed hole (not shown) in the bottom of the camera 30. The fixing member 12 is also fixed removably by a grooved pin 14 extending from the rear end of the fixing member 12 backward into a hole 15 formed on the front end of the turning member 11 with the aid of a lock mechanism (not shown) that locks the camera fixing member 12 to the front end of turning member 11. An unlock button 16 which is pressed to release this locked state is provided on top of the turning member 11 to be.

The digital camera 30 according to predetermined standards is a commercially available rectangular one that has a body, for example, 87 mm wide, 54 mm high, 22.9 mm thick and that has a zooming image pickup lens 31 adapted to be retracted into the camera body when the power supply is off and extruded from its front when the power supply is on, thereby picking up an image of a picture/document A placed on the foot 1. The camera 30 has on its front a strobe light and an auxiliary illumination light (none of them is shown) and on its rear end a monitor display 32, an optical finder 33, a mode selector 34, and a zooming button 35. The camera 30 also has on its top a power supply switch 36, a shutter button 37 and a connector 38 (FIG. 8) through which the camera is connected to an external device such as a (personal) computer.

As shown in FIG. 7, a document illumination light 17, which comprises an LED (light emitting diode) that illuminates a document A placed on the document rest 1 and a diffuser plate for the light emitted by the LED is provided on a lower surface of the turning member 11 of the camera holder 10.

Two finger holes 7 are provided on opposite inner sides of the recess 6 in the support 5 at positions near the pivot unit 4 such that the support arm 8 can be raised easily when the camera stand is used, by inserting a user's fingers into the recesses 7, holding the camera 30*a* with the fingers, and then pulling out the camera 30 forward from the holes 6 in the support 5.

The support 5 has on one side an outside connector 18 that is used to connect the digital camera 30 attached to the camera holder 10 to an external device such as personal computer (not shown), an adapter jack 19 into which an AC adapter 27 (FIG. 8) that converts AC power to DC power is inserted to provide the camera 30 with the DC power, a power key 20 that turns on/off a power supply of the camera 30, a light key 21 that lights up the picture/document illumination light 17 provided on the lower surface of the turning member 11 of the camera holder 10.

The camera fixing member 12 of the camera holder 10 has on its front 12*a* a male (or female) connector 22 that is fitted into a female (male) connector 38 provided on the bottom of the camera 30 (FIG. 8) for connection to the outside connector 18.

Figure 8:
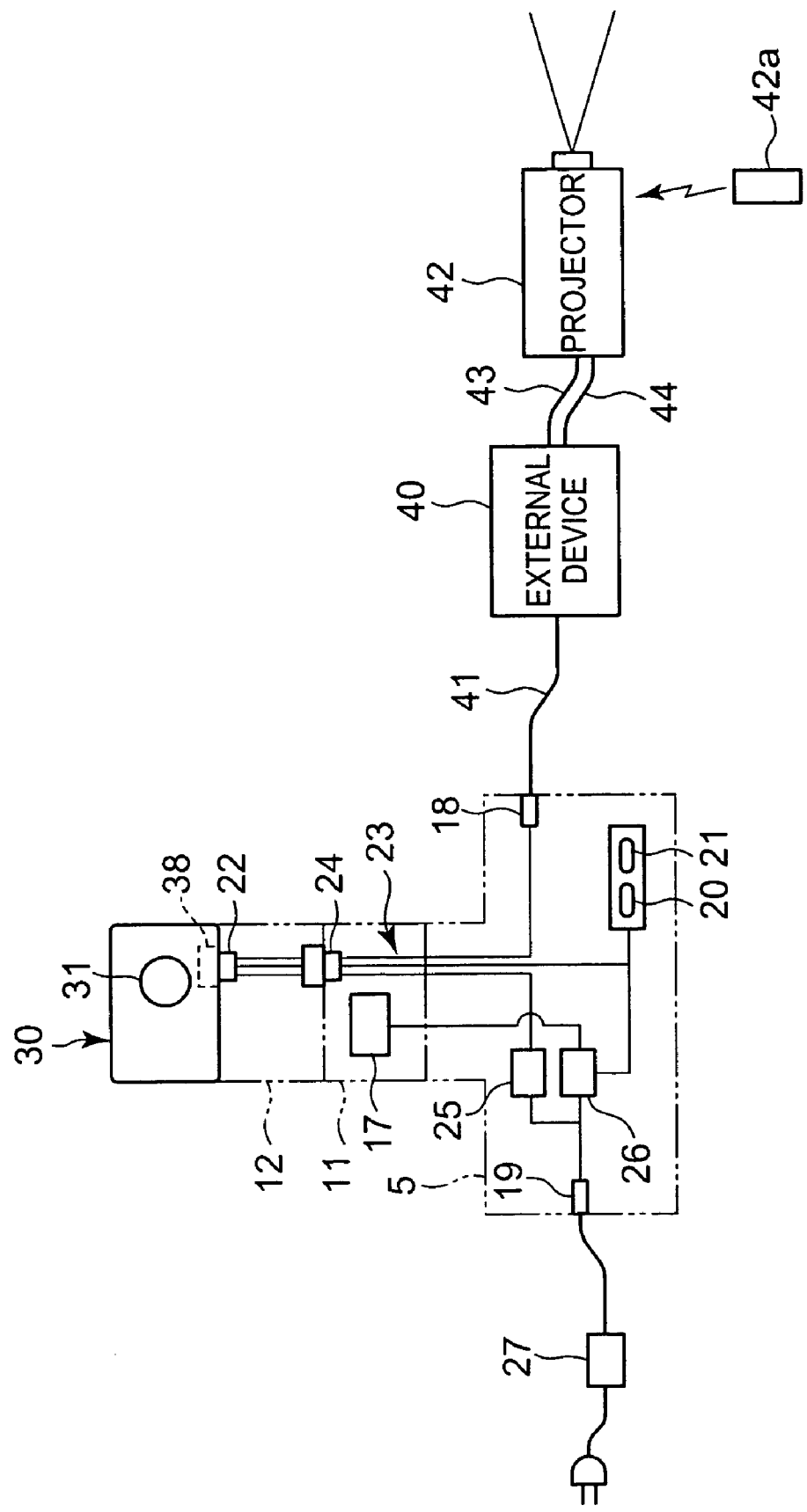
FIG. 8 illustrates connection of an electric circuit of the first embodiment to an external device.

The connector 18 provided on the support 5 and the male connector 22 of the camera fixing member 12 are connected electrically by a USB (Universal Serial Bus) cable 23 that extends through the support 5, the arm 9, the turning member 11 and the fixing member 12 via a separable relay connector 24 provided between the turning member 11 and the fixing member 12 of the camera holder 10 (FIG. 8).

As shown in FIG. 8, the support 5 contains a charging circuit 25 that charges a battery (not shown) of the camera 30 attached to the camera holder 10, and a light driver 26 for the document illumination light 17 provided on the turning member 11 of the camera holder 10. The charging circuit 25 and the light driver 26 are connected to the AC jack 19. The charging circuit 25 is connected to the camera connector 22 provided on the camera fixing member 12 over the USB cable 23 and charging leads and terminals (not shown) provided in the relay connector 24. The illumination light driver 26 is connected to the document illumination light 17 by leads extending through the support 5, the arm 9 and the turning member 11 of the camera holder 10. The light driver 26 and the illumination light 17 may be connected by the USB cable 23 in place of the connecting leads.

The power key 20 provided on the support 5 is connected to the camera connector 22 through the USB cable 23, and the camera power supply leads and terminals provided in the relay connector 24. The light key 21 is connected to the illumination light driver 26 over leads extending through the support 5.

The outside connector 18 provided on the support 5 is connected by an external-device connection USB cable 41 to an external device 40 that controls the digital camera 30 and that processes picked-up image data from the digital camera 30. An image based on an image signal sent from the camera 30 is displayed on an image display (for example, LCD panel) (not shown) of the external device 40. A projector 42 that enlarges the displayed picture and projects it onto a large screen (not shown) is connected by a control signal cable 43 and an image signal cable 44 to the external device 40.

The external device 40 comprises, for example, a programmed personal computer that controls the digital camera 30 in accordance with command signals from the projector 42 by operating a control unit (not shown) of the projector 42 or its remote controller 42a, processes picked-up image data from the digital camera 30 and delivers a resulting image signal to the projector 42.

The camera stand of this embodiment excluding that of the camera 30 is inexpensive due to its simple structure. The user can separate the camera from the stand and use it by itself as the need arises. In the embodiment, the camera holder 10 comprises the turning member 11 provided rotatably at the upper end of the arm 9, the camera fixing member 12 supporting the camera 30 removably, engaging means (the grooved pin 14, the pin receiving hole 15, and the locking mechanism for locking the pin 14 in the hole 15, and the unlock button 16) that fixes the camera fixing member 12 removably to the turning member 11. Thus, the fixing member 12 with the camera 30 fixed thereto can easily be attached/removed to/from the turning member 11.

In the embodiment, the use of the fixing member 12 and the screw 13 that is screwed through the fixing member 12 into the tripod screwed hole in the bottom of the camera 30 facilitates attachment/removal of the camera 30 to/from the camera fixing member 12.

In this embodiment, the camera 30 can be electrically connected to the external device 40 through the camera stand, and charged using the electric circuit of FIG. 8.

In the embodiment, since the driver 26 for the document illumination light 17 that illuminates the document A placed on the document support 1 is provided, the document A, whose image is to be picked up, placed on the picture/document rest 1 can be illumined without consuming the power of the built-in power supply of the camera 30.

While in the embodiment the document illumination light 17 is provided on the turning member 11 of the camera holder 10, the light 17 may be provided on the camera fixing member 12. In that case, the light 17 and its driver 26 may be connected by the USB cable 23 and the relay connector 24 that connect the outside connector 18 provided on the support 5 and the connector 22 provided on the camera fixing member 12.

Alternatively, the document illumination light 17 may be provided on the arm 9 of the arm mechanism 8 or the front of the support 5 and not limited to provision on the turning member 11 or the camera fixing member 12. As a further alternative, such a light 17 may be provided on each of the support 5 and the arm 9.

While it is designed in the camera stand of this embodiment that the camera 30 having on its bottom the connector 38 for connection to the external device is used to pick up an image of the document A, a camera that will be used for such purpose may have such connector on its front, rear or side. In that case, the USB cable 23 is required to be pulled out from the upper end of the support 5 or an appropriate point on the arm 9 or the camera holder 10 and connected at its free end to the camera connector 22.

In the camera stand, a digital camera other than that adapted for the design of the camera stand may be attached to the camera holder 10, thereby allowing the camera to pick up an image of the document A. In this case, if the digital camera can not be received snugly within the recess 6 in the support 5, the camera is required to be removed from the holder 10, and then the support arm 9 folded into the recess 6 in the support 5.

While the pair of side plates 1b of the document rest 1 are illustrated as having the half width of the central plate 1a, they may have different widths as long as their overall width is equal to, or smaller than, the width of the central plate 1a for folding purposes.

While in the embodiment the support 5 is illustrated as having substantially the same width and length as the central plate 1a of the document rest 1, the support 5 may have a different length from the central plate 1a. In that case, the support 5 can be folded on the central plate 1a to bring about a compact folded state if the support 5 has substantially the same width as the central plate 1a.

Second Embodiment

Figure 9:
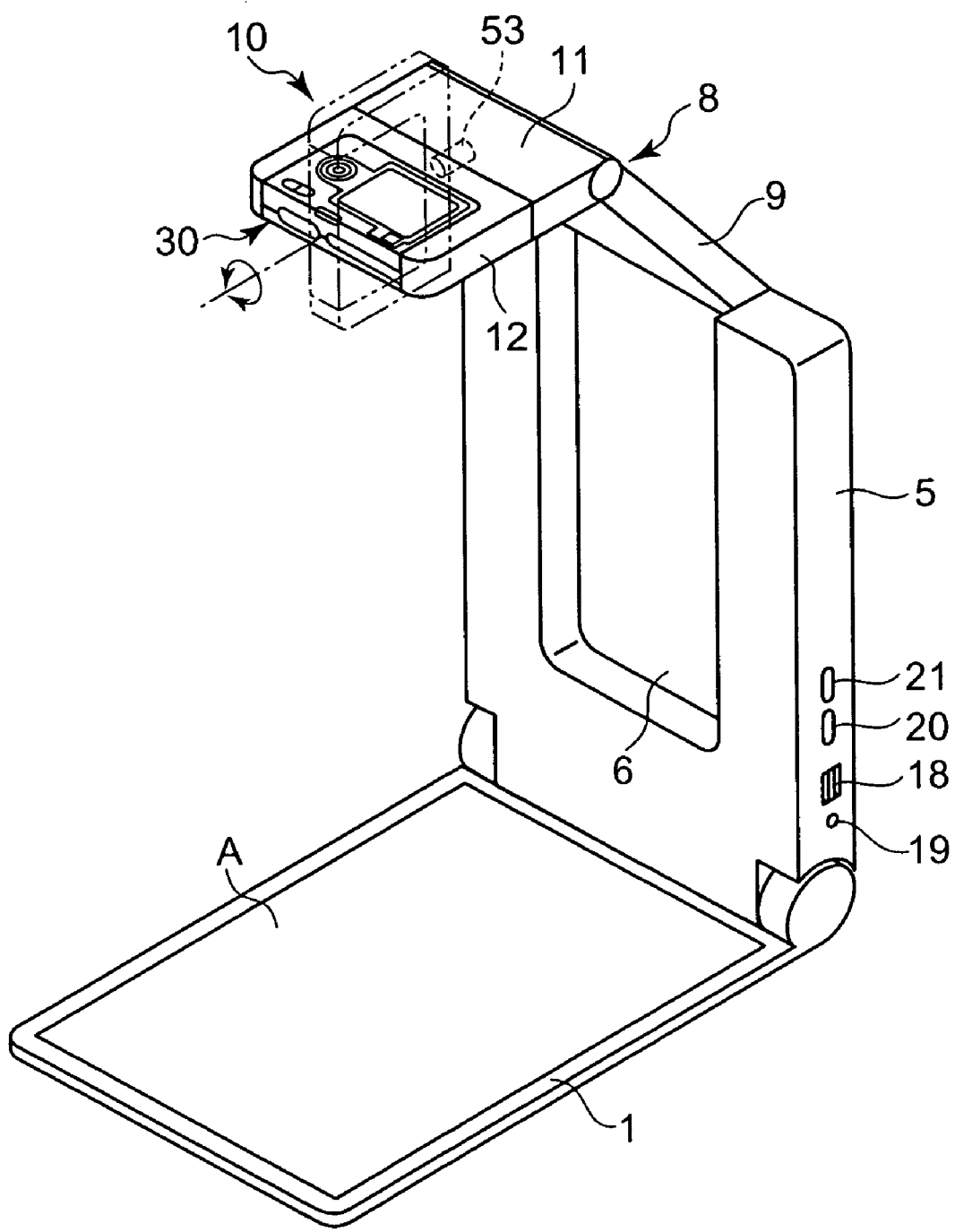
FIG. 9 is a perspective view of a second embodiment of the camera stand in use.
Figure 10:
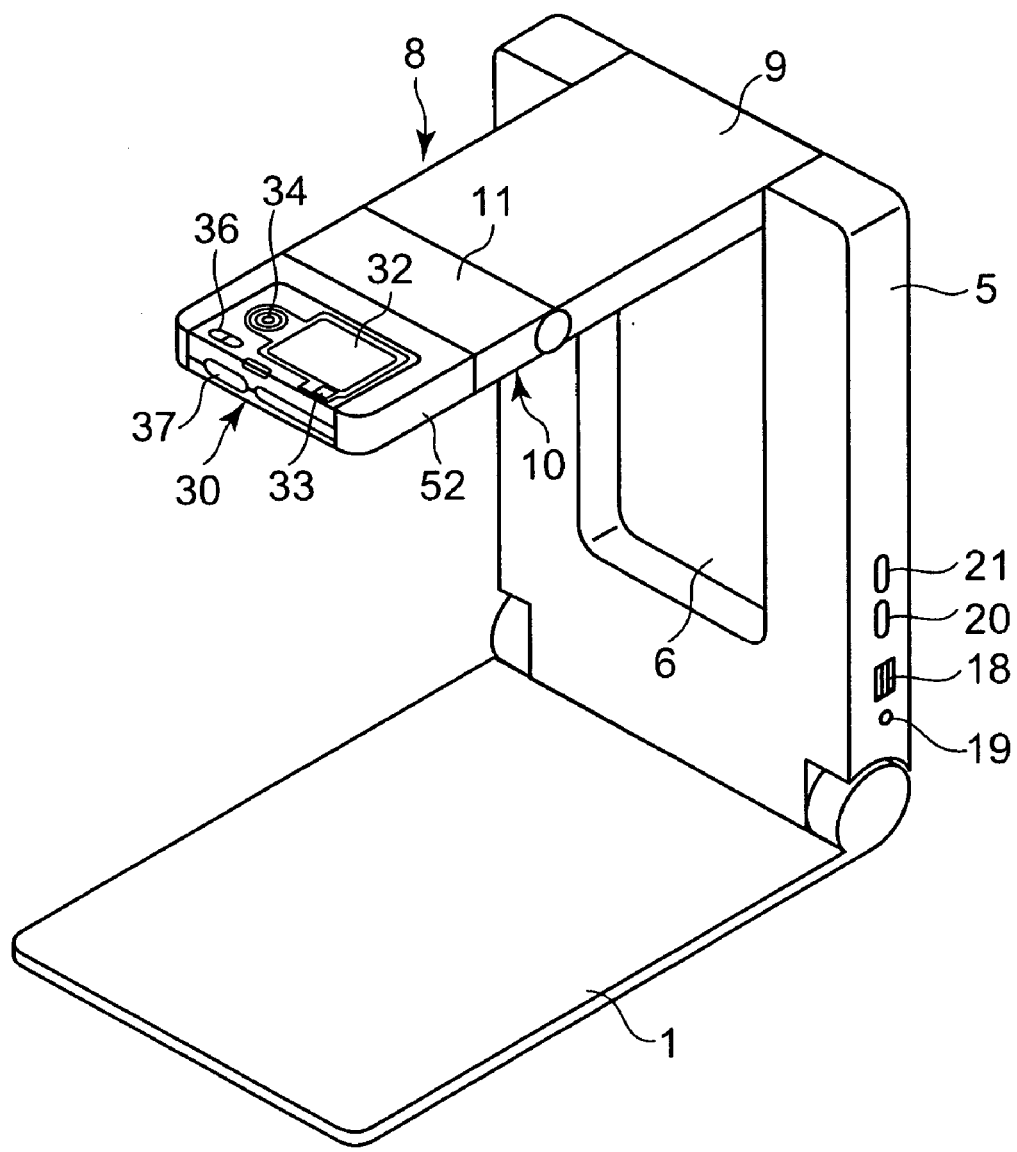
FIG. 10 is a perspective view of the second embodiment in a folding state.
Figure 11:
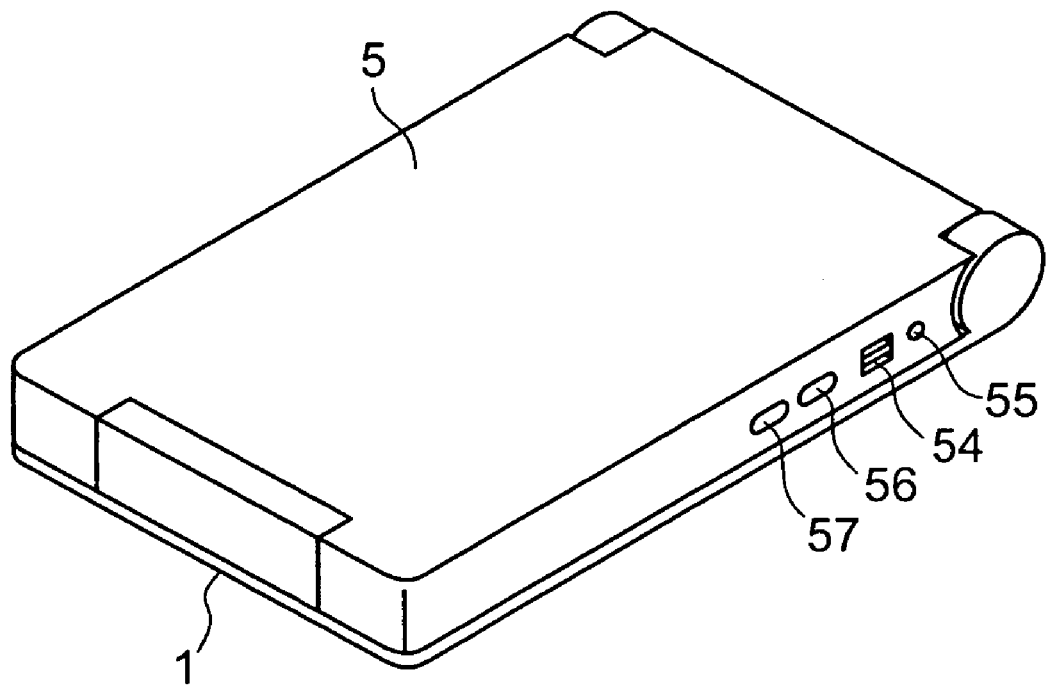
FIG. 11 is a perspective view of the second embodiment in a folded state.

FIGS. 9-11 illustrate a second embodiment of the camera stand according to the present invention. FIG. 9 is a perspective view of the camera stand in use. FIG. 10 is a perspective view of the second embodiment in a folding state. FIG. 11 is a perspective view of the second embodiment in a folded state.

The second embodiment is substantially the same in structure, operation and advantage as the first embodiment excluding several points which will be mainly described next and further description of like structural, operational and advantageous points thereof will be omitted.

In this embodiment, the foot or picture/document rest 1 of the camera stand which will be placed, for example on a table, is in the form of a single rectangular plate somewhat larger than an A4 size and whose rear shorter side is connected rotatably to the lower end of the support 5 in a prior art manner. The support 5 has a rectangular configuration substantially equal to that of the foot plate 1.

A fixing member 52 of the camera holder 10 that receives the camera 30 removably therein comprises a U-like one that is rotatably supported at its bottom center by a pin 53 extending forwards from the turning member 11. Thus, the camera 30 can be set at a desired angle to the turning member 11, for example as shown by a solid or phantom line, such that an image of an object placed under or laterally from the camera can be picked up.

A document illumination light (not shown) is provided either on a lower surface of the turning member 11 or fixing member 52. Alternatively, it may be provided on the arm 9 of the arm mechanism 8, the front of the support 5 or each of the support 5 and the arm 9.

The fixing member 52 has electric connectors such as shown by 22 and 24 of FIG. 1 for connection to the USB cable 23 and leads to establish an electric circuit such as shown in FIG. 8 in the camera stand of FIG. 9.

While in the embodiment the support 5 is illustrated as having substantially the same size as the picture/document rest 1, the support 5 may be different in length from the rest 1. In this case, if the support 5 has substantially the same width as the document rest 1, the camera stand can be folded into a compact block, as shown in FIG. 11.

Third Embodiment

Figure 12:
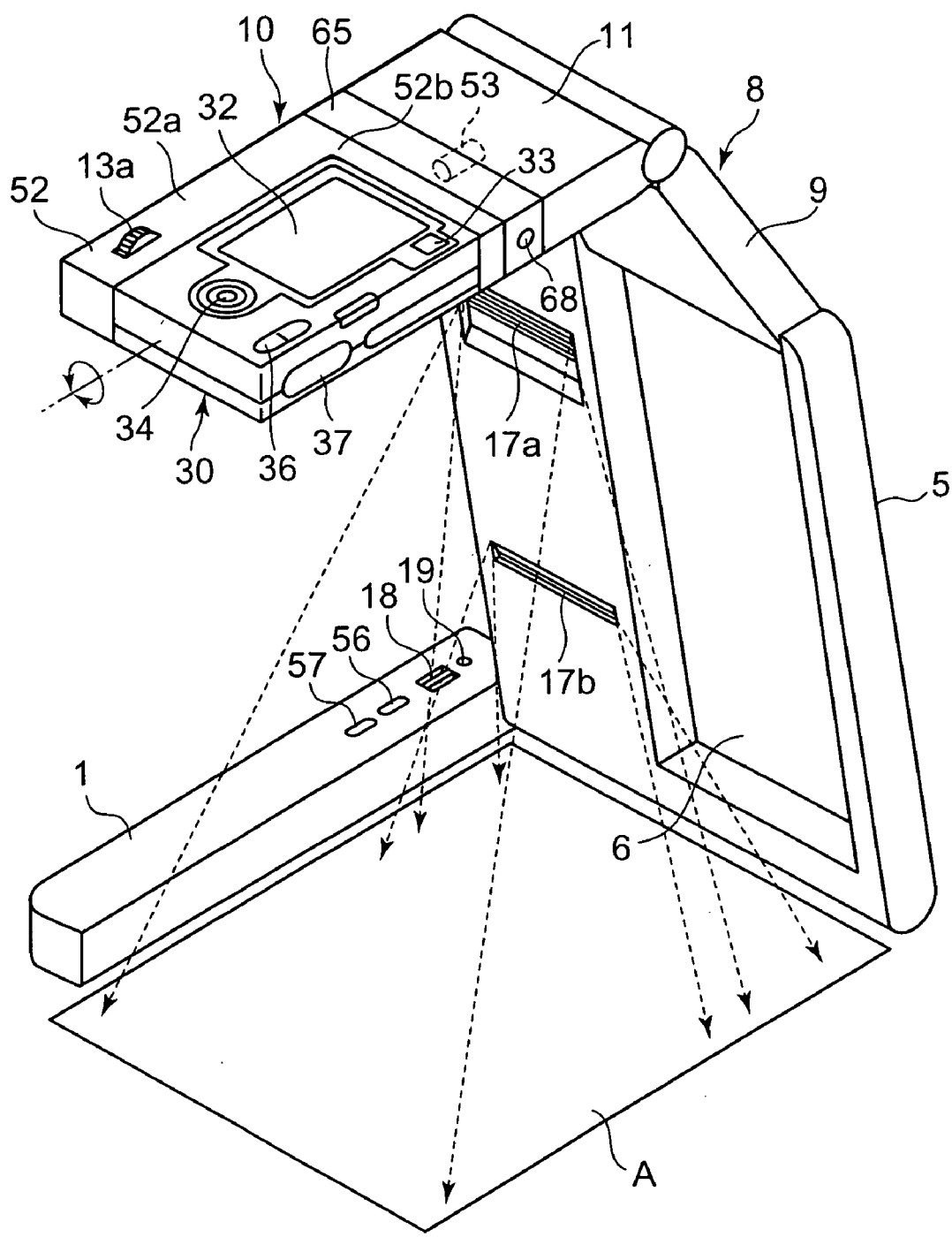
FIG. 12 is a perspective view of a third embodiment of the camera stand in use.
Figure 13:
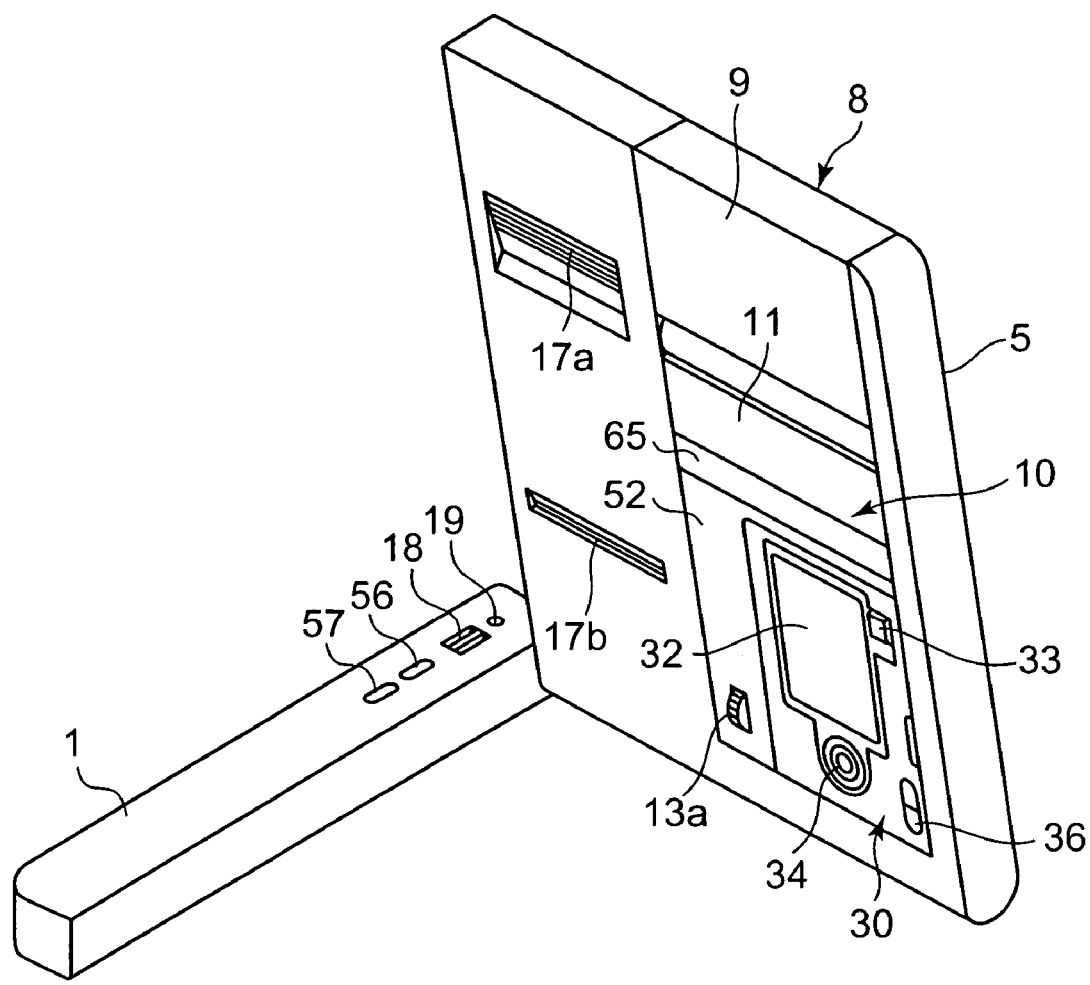
FIG. 13 is a perspective view of the third embodiment in a folding state.
Figure 14:
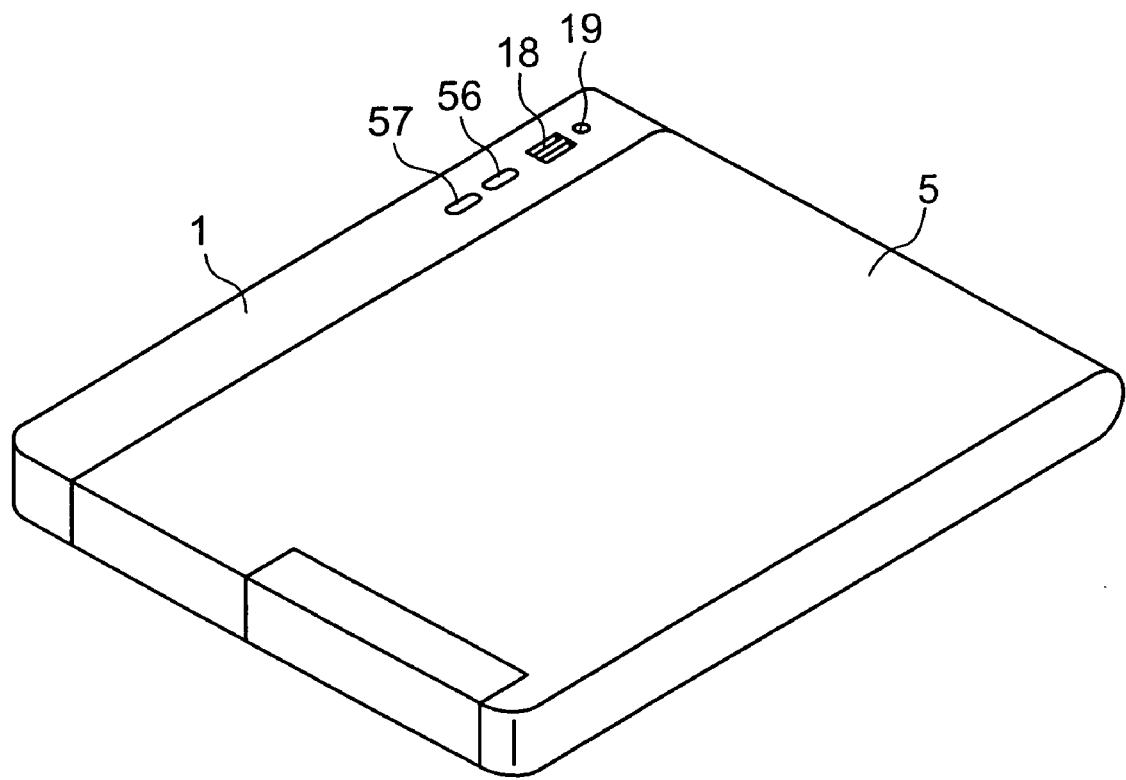
FIG. 14 is a perspective view of the third embodiment in a folded state.

FIG. 12 is a perspective view of a third embodiment of the camera stand in use. FIG. 13 is a perspective view of the third embodiment in a folding state. FIG. 14 is a perspective view of the third embodiment in a folded state.

The third embodiment is substantially the same in structure, operation and advantage as the second embodiment excluding several points, which will be mainly, described next and further description of like structural, operational and advantageous points thereof will be omitted.

The camera stand of this embodiment comprises a single hollow square-cross-sectional rod-like foot 1 that will be placed, for example on a table, and that is connected at its rear end portion through a pivot (not shown) extending perpendicular to the foot 1 to a lower side end of the support 5 such that the foot 1 cooperates with the support 5 to support the support 5 rotatably at a desired angle to the horizon. The foot 1 comprises a hollow substantially the same length as the support 5.

The support 5 comprises a rectangular plate with a size somewhat lager than an A4 size and a thickness of approximately 35-40 mm that is thicker than the digital camera 30. The support 5 has on its front a rectangular recess 6 in a right half thereof that is adapted to receive the arm 9, the camera holder 10 and the camera 30*a* arranged in the same plane.

In use, the camera stand is set such that the camera 30 can pick up a best image of a picture/document A placed downwards by setting the respective optimal angles of the arm 9, first and second turning members 11 and 65 to the support 5, the arm 9, and the first turning member 11, respectively. In non-use, the camera 30, the camera holder 10 and the arm 9 are arranged in the recess 6 in the support 5 by turning them appropriately and then the support that has received them therein is folded so as to share the same plane with the rod-like foot 1.

The camera fixing member 52 of the camera holder 10 is in the form of an L of sides 52*a* and 52*b* that supports the camera 30 on its L-like inner edge. The side 67*b* of the L is fixed removably by fixing means such as shown by 14 and 15 in FIG. 6 to the second turning member 65, which is then supported on the pivot 53 extending forwards from the first turning member 11. Reference numeral 68 denotes an unlock button 68 provided on a side of the second turning member 65 for releasing the fixing state of the fixing means.

A screw whose head 13*a* appears partly is used to fix the side 67*a* of the U and the camera as in FIG. 6.

In this embodiment, two upper and lower document illumination lights 17*a* and 17*b* are provided sinkably on the front of a left half of the support 5. In this embodiment, the connector 18, AC jack 19, power key 56, and light key 57 similar in function to those in the first embodiment (FIG. 1) are provided on top of the rod-like foot 1 and not on the support 5. A cable and leads concerned are provided extending through the foot 1 into the body of the camera stand of this embodiment to establish an electric circuit such as shown in FIG. 8. The power key 57 is used to turn on/off the document illumination lights 17*a* and 17*b*.

The document illumination light may be provided on the arm 9 or the camera holder 10 (the first or second turning member 11 or 65 or fixing member 52) or each of the support 5 and the arm mechanism 8. A charging circuit and a driver such as shown by 25 and 26, respectively, in FIG. 8 are provided in any one of the foot 1 and the support 5.

In this embodiment, since the rod-like foot 1 has substantially the same thickness as the support 5, the camera stand can be folded in non-use such that the foot 1 and the support 5 are placed in a stepless flat state, as shown in FIG. 14.

In this camera stand, although the single rod-like foot 1 is disposed on one side of the support 5 the foot 1 can cooperate with the support 5 to support the support 5 to a desired angle, for example, to a table in a stabilized manner in use.

Fourth Embodiment

Figure 15:
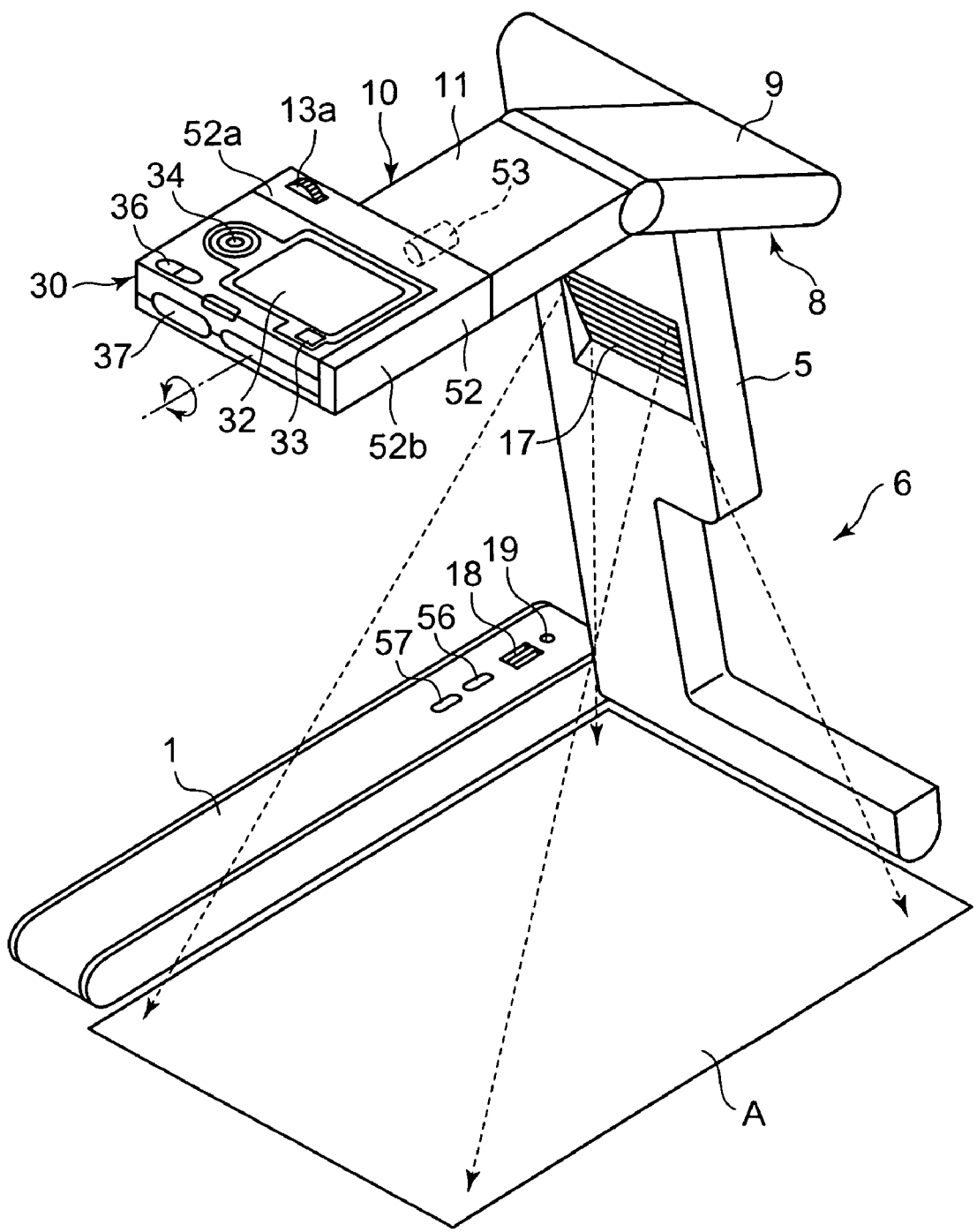
FIG. 15 is a perspective view of a fourth embodiment of the camera stand in use.
Figure 16:
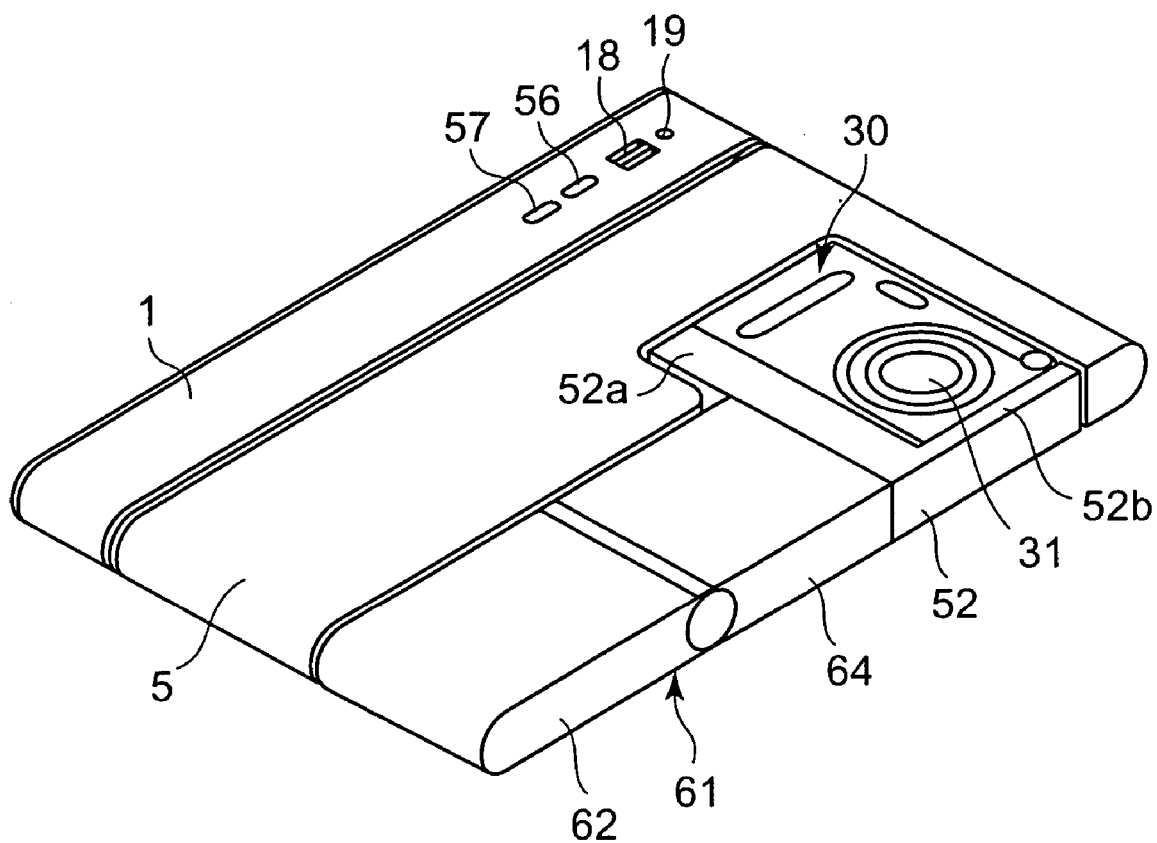
FIG. 16 is a perspective view of the fourth embodiment in a folding state.

FIGS. 15 and 16 illustrate a fourth embodiment of the camera stand of the present invention. FIG. 15 is a perspective view of the fourth embodiment in use. FIG. 16 is a perspective view of the fourth embodiment in a folded state.

The fourth embodiment is substantially the same in structure, operation and advantage as the third embodiment excluding several points that will be mainly described next and further description of like structural, operational and advantageous points thereof will be omitted.

In this embodiment, the digital camera 30 is attached rotatably to the camera holder 10 such that the fixing member 52 aligns with the turning member 11 on this side. The fixing member 52 is in the form an L fixed removably by the screw whose head is shown by 13*a* to the camera 30 as in the third embodiment and supported rotatably by the pivot 53 extending forwards from the turning member 11. The support 5 is cut on this side thereof such that in non-use the support 5 can receive the arm 9, the turning member 11, the fixing member 52 and the camera 30 within the cut 6 in a state in which they are arranged so as to extend in the same direction as the support 5. At this time, the whole form of the stand 5, arm 9, the fixing member 52, the turning member 11 and camera 30 arranged so is designed so as to be a rectangle somewhat larger than the A4 size. The whole rectangle can be then folded so as to have the same plane as the rod-like foot 1, thereby providing a compact block, as shown in FIG. 16.

It is noted that the arm mechanism 8 is supported rotatably at its lower end on one side of the upper end of the support 5 in FIG. 15.

The document illumination light 17 provided sinkably on the front of the support 5 at an upper position may be provided on the arm 9 or camera holder 10 (any one of the turning member 11 and the fixing member 52) or each of the support 5 and the arm mechanism 8.

While in this embodiment the support 5 is illustrated as cut on this side thereof, as shown by 6, so as to receive the arm 9, the turning member 11, the fixing member 52 and the camera 30 therein, the support 5 may take the form of a rectangle with an opening for receiving these elements therein.

Fifth Embodiment

Figure 17:
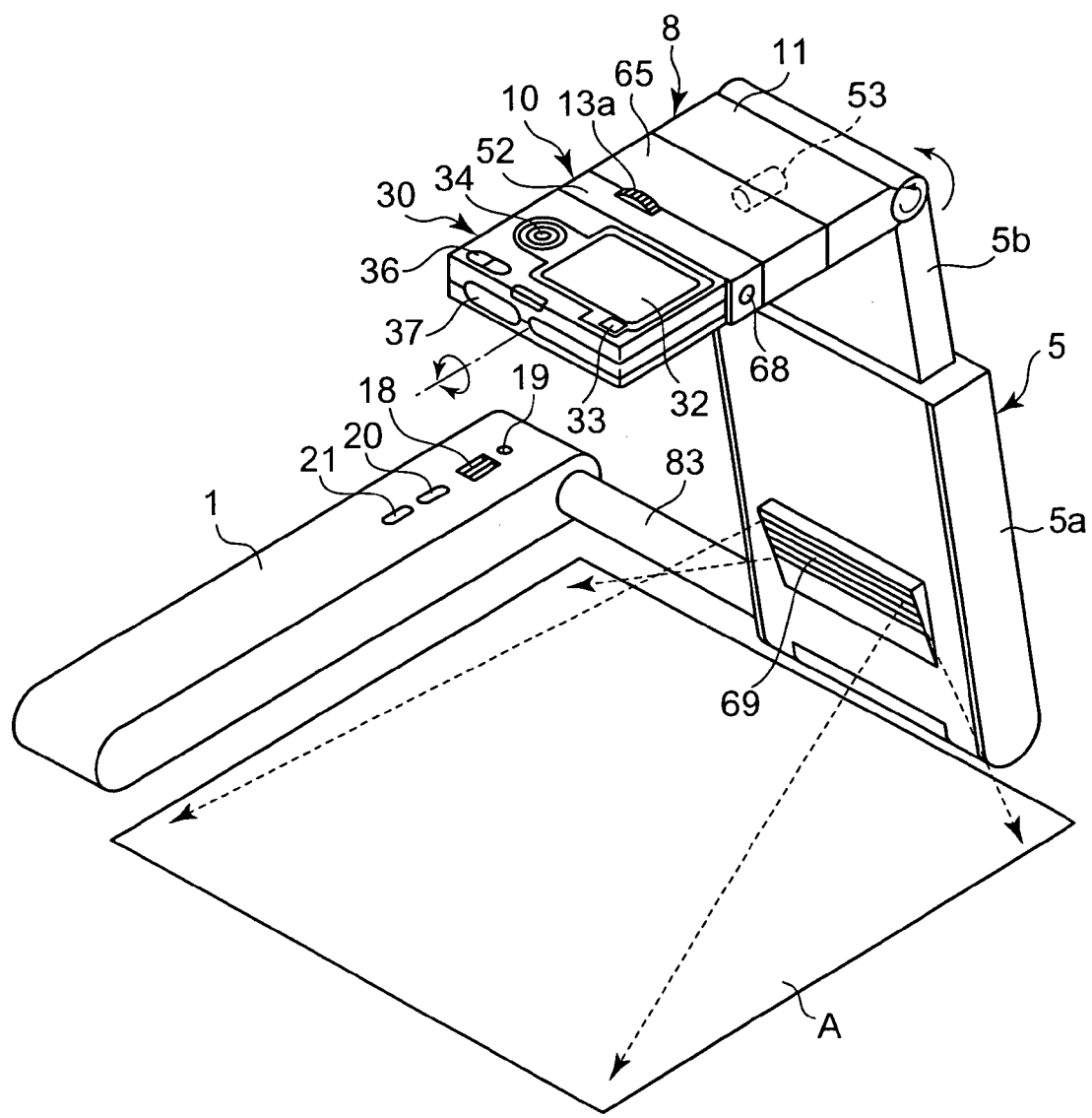
FIG. 17 is a perspective view of a fifth embodiment of the camera stand in use.
Figure 18:
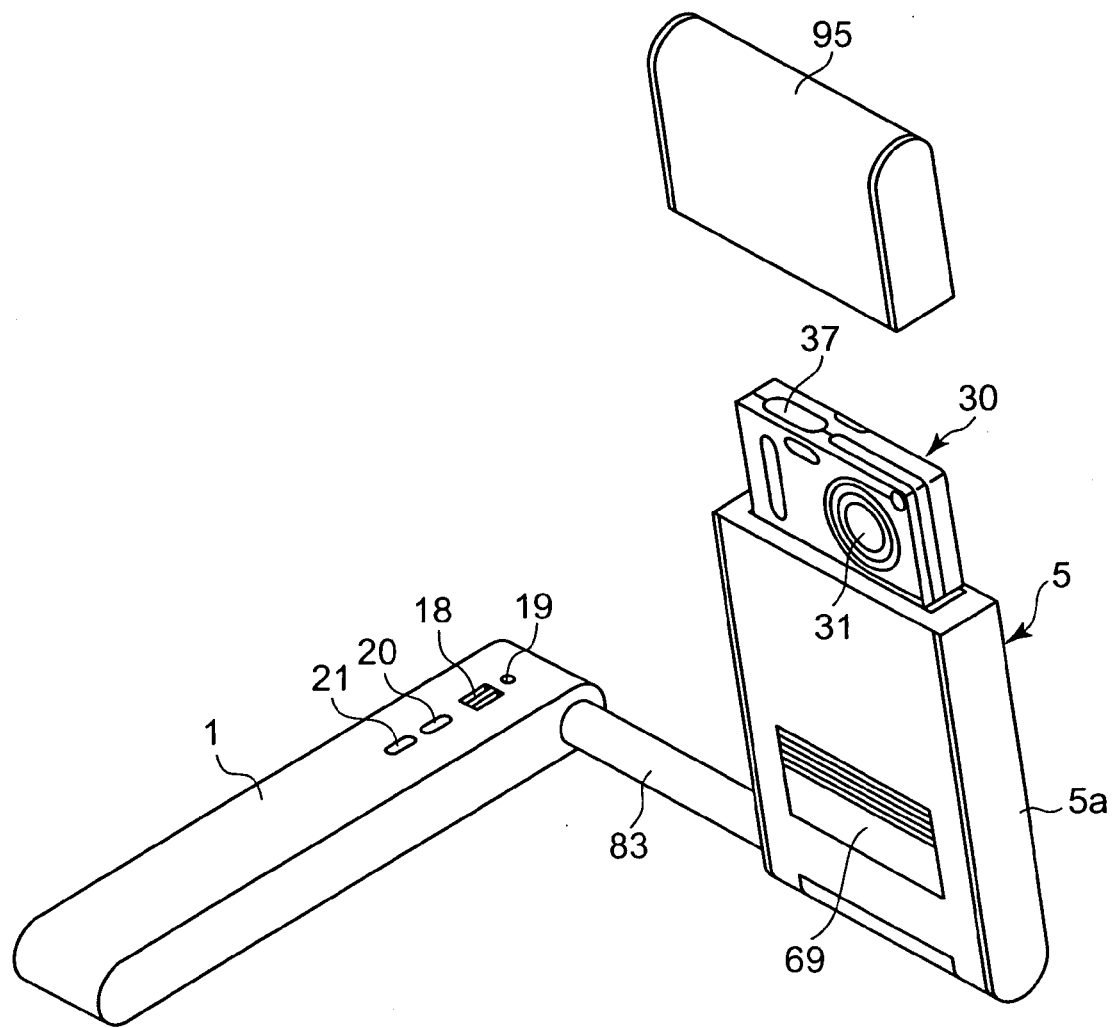
FIG. 18 is a perspective view of the fifth embodiment in a folding state.
Figure 19:
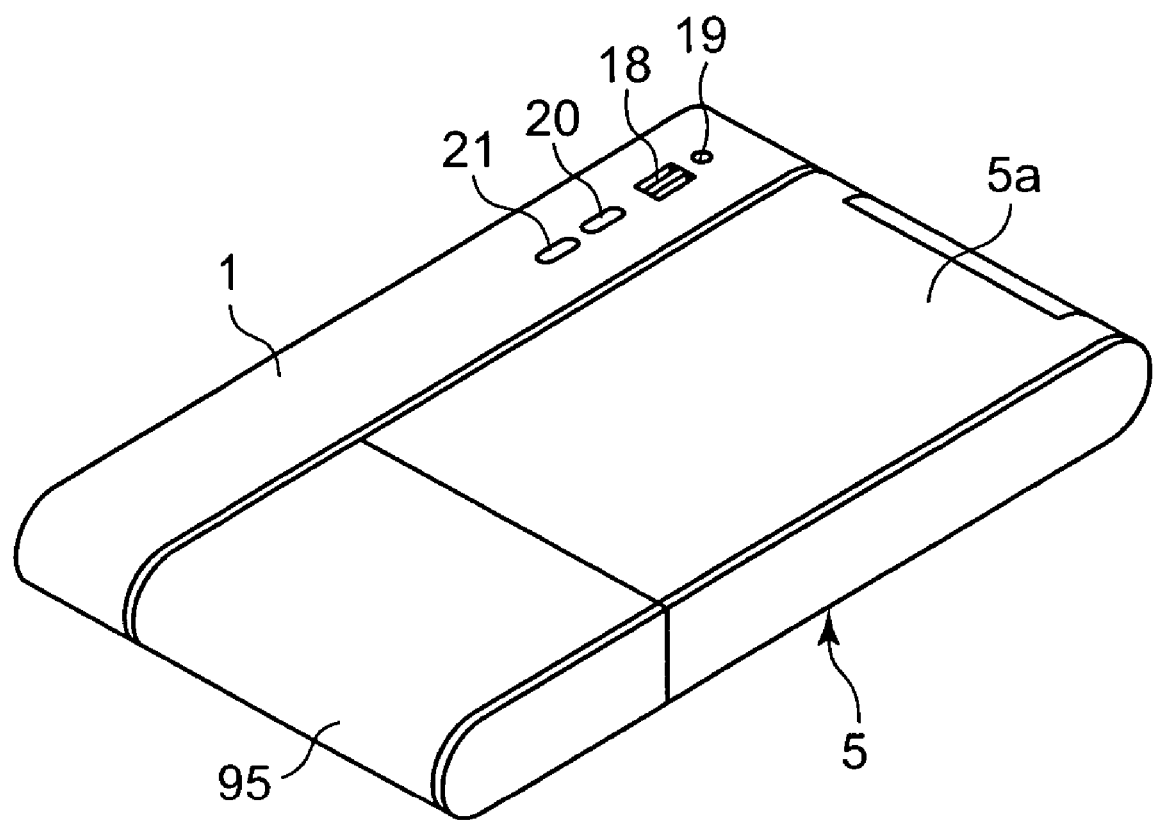
FIG. 19 is a perspective view of the fifth embodiment in a folded state.

FIGS. 17-19 illustrate a fifth embodiment of the camera stand. FIG. 17 is a perspective view of the camera stand in use. FIG. 18 is a perspective view of the camera stand in a folding state. FIG. 19 is perspective view of the camera stand in a folded state.

The fifth embodiment is substantially the same in structure, operation and advantage as the third embodiment excluding several points that will be mainly described next and further description of like structural, operational and advantageous points thereof will be omitted.

In this camera stand, the support 5 is supported at a lower end rotatably around a pivot 83 extending perpendicular to the rod-like foot 1 from a rear end of the rod-like foot 1 so as to slide along the pivot 83.

The support 5 comprises a plate-like first support part 5a with a hollow rectangular cross section, and a second plate-like support part 5b nestable within the hollow of the first support part 5a such that the second support part 5b can be drawn out from the first support part 5a and locked in use and retracted along with the arm mechanism 8 (including the turning member 11 and the camera holder 10) into the first support part 5a with the camera 30 left outside in non-use. The first support part 5a is approximately 35-40 mm greater than the commercially available camera 30.

The camera 30 can be covered with a removable cap 95 for protecting purposes, for example in non-use. The cap 95 has substantially the same thickness as the support 5. The total length of the first support part 5a and the cap 95 that covers the camera 30 when the second support part 5b, the arm 11 and the camera holder 10 (including the turning member 65 and the fixing member 52) are received within the first support part 5a with the capped camera left outside is designed so as to be substantially equal to the length of the rod-like foot 1. Thus, when the first support part 5a is folded so as to have the same plane with the foot 1, a compact block of the camera stand is obtained as shown in FIG. 19.

In this embodiment, the fixing member 52 is in the form of an I. The unlock button 68 that releases a locked state between the fixing member 52 and the turning member 65 of the camera holder 10 is provided on the fixing member 52.

In this embodiment, the document illumination light 69 is provided sinkably on a lower front of the first support part 5a such that it can emit light obliquely downward onto a picture or document A placed before the light 69. In non-use, the light 69 can be sunk into the front of the first support part 5a. The light 69 may be provided on the front of the second support part 5b, the arm 11 or the camera holder 10 (any one of the turning member 65 and the fixing member 52) or each of the second support part 5b and the arm 11.

In use, the camera holder 10 with the camera, the arm 11 and the second support part 5b are drawn out from the first support part 5a, and the angles of the camera holder 10 and the arm 11 to the arm 11 and the second support part 5b, respectively, are then adjusted to support the digital camera 30 at a position distant appropriately upwards from the picture/document so as to read its best image. In non-use the camera holder 10, the arm 11 and the second support part 5b are received within the first support part 5a with the camera 30 with the cap left thereon. The whole support 5 is then drawn laterally to the foot 1 and folded so as to share the same plane as the foot 1.

As described above, in the camera stand of this embodiment the first support 5a is supported at its lower end by the pivot 83 of the foot 1 so as to be rotatable around the pivot and slidable along the pivot. Thus, the whole width of each of the support 5, the arm 11 and the camera holder 10 is reduced compared to the first-fourth embodiments.

In this embodiment, the appearance of the support 5 is simplified, thereby providing improved designability since the first support part 5a receives the second support part 5b, the arm 9 and the camera holder 10 in the inner space thereof.

In this embodiment, the second support part 5b, the arm 9 and the camera holder 10 are adapted to be received within the first support part 5a with the capped camera 30 left outside. Thus, the configuration of the space within the first support part 5a that receives the second support part 5b, the arm 9 and the camera holder 10 is simplified since a somewhat complicated outer shape of the digital camera 30 need not be taken account of.

Sixth and Seventh Embodiments

Figure 20:
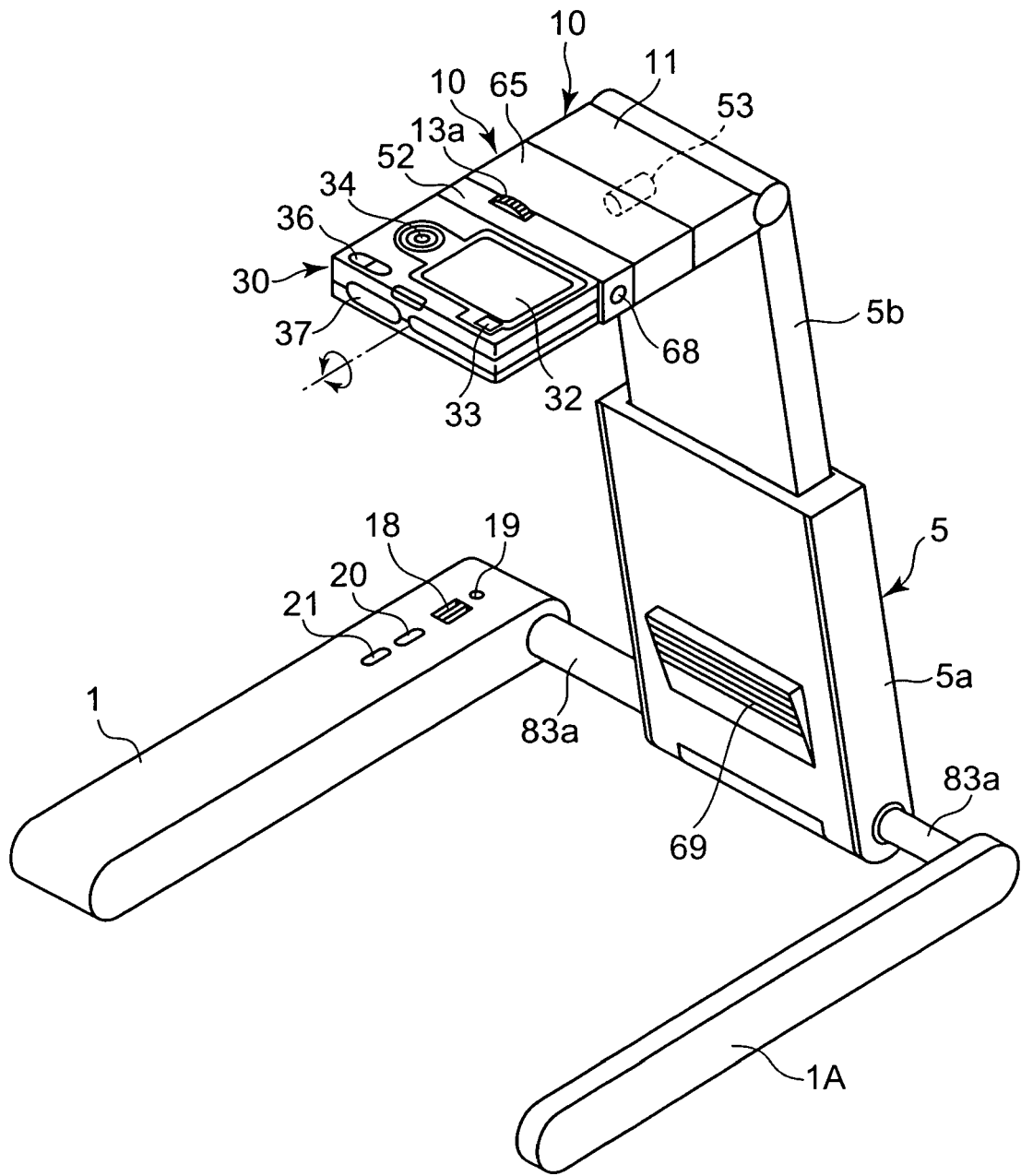
FIG. 20 is a perspective view of a sixth embodiment of the camera stand in use.
Figure 21:
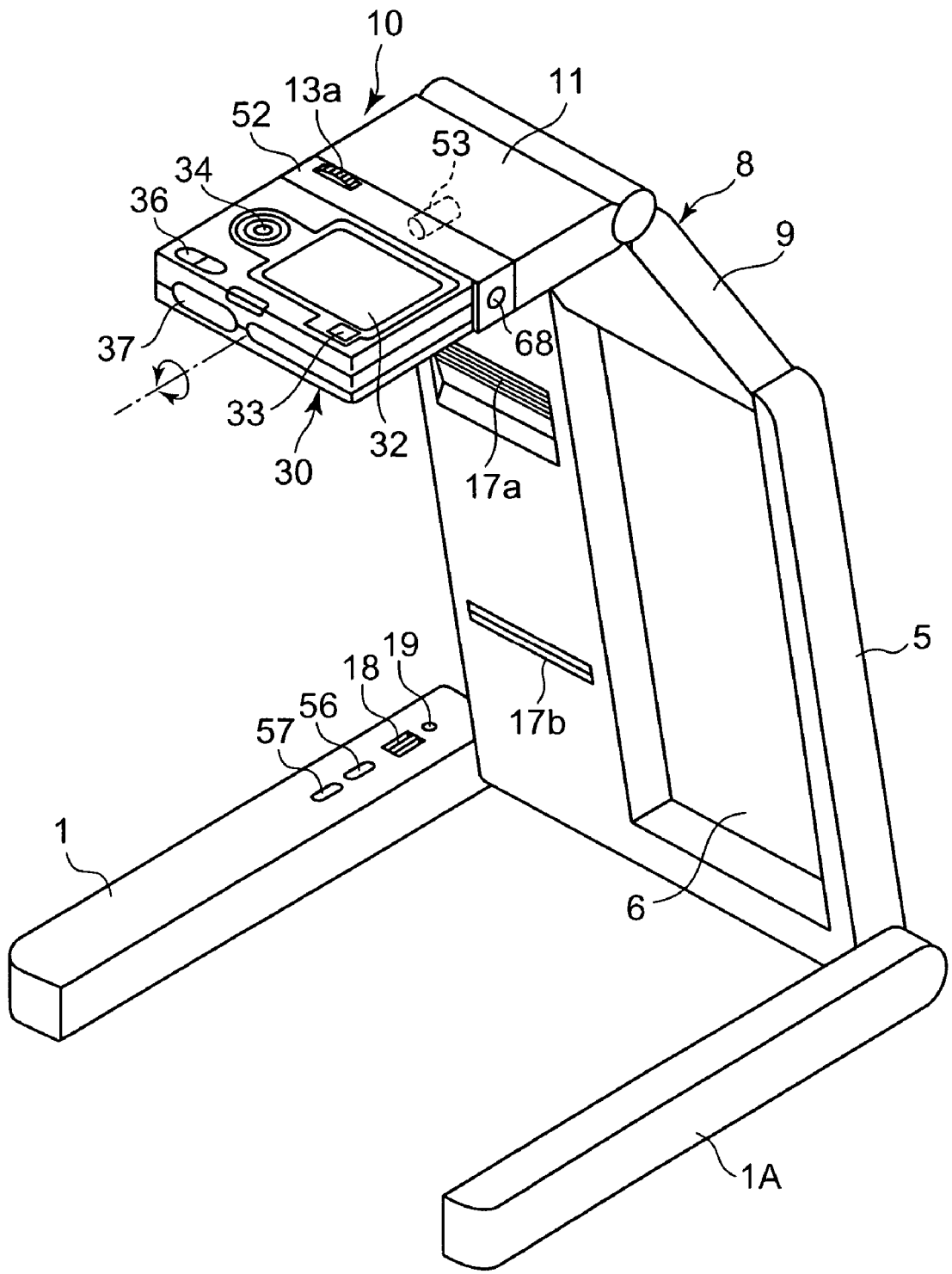
FIG. 21 is a perspective view of a seventh embodiment of the camera stand in use.

FIG. 20 is a perspective view of a sixth embodiment of the camera stand according to the present invention. FIG. 21 is a perspective view of a seventh embodiment of the camera stand.

The camera stand of the sixth embodiment comprises a combination of the fifth embodiment of FIGS. 17-19 and an additional rod-like foot 1A disposed so as to be symmetrical with the foot 1 with reference to the first support, thereby causing the two rod-like feet 1 and 1Aa to cooperate to rotatably support the support 8 and hence to increase its stability.

In the camera stand of the sixth embodiment, the pivot 83a can extend so as to receive an A4 size picture or document between the two feet 1 and 1A and also retract so as to have a length substantially equal to the width of the support 5 or the arm mechanism 8.

The embodiment of FIG. 21 is equal in structure to a combination of the third embodiment of FIGS. 12-14 and an additional foot 1A similar to the corresponding one of FIG. 20 except that the camera fixing member 52 is of an I-like one and that no turning member such as shown by 65 in FIGS. 12-14 is used. Further, while the digital camera 30 is illustrated as attached to the L-like fixing member 52 in the third embodiment of FIGS. 12-14 mentioned above such that the shutter button 37 appears on this side of the camera 30 while the camera 30 is attached to the I-like fixing member 52 in the camera stand of the seventh embodiment such that the shutter button 37 appears on the front end of the camera.

In the fourth embodiment of FIGS. 15 and 16, the camera stand may have an additional foot such as shown by 1A in FIG. 21 such that both the feet 1 and 1A cooperate to support the support 5 rotatably at its lower end for improving stability of the camera stand.

(Modifications)

In the camera stands of the first and second embodiments, the folding or single flat foot plate 1 may be replaced with one or two rod-like feet shown by 1 or 1A. In the third-seventh embodiments of the camera stand, the rod-like feet 1 and 1A may be replaced with a picture/document rest such as shown in FIG. 1.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application Nos. 2003-298844 filed on Aug. 22, 2003 and 2004-175716 filed on Jun. 14, 2004 and each including specification, claims, drawings and summary. The disclosure of the above Japanese patent application is incorporated herein by reference in its entirety.

What is claimed is:

1. A camera stand comprising:
   a foot adapted to support the camera stand on a surface;
   a support having opposite first and second ends and being rotatably supported on the foot at the first end, the support being movable between a lying position and an upstanding position;
   an arm mechanism having first and second opposite ends and including a camera holder at the first end which is adapted to removably hold a digital camera, the arm mechanism being D rotatably supported at the second end by the second end of the support such that the arm mechanism is angularly adjustable in relation to the support;
   an external device connector arranged within one of the foot and the support for enabling the camera stand to mate with an external device;
   a camera connector arranged on the camera holder for mating with the camera when held by the camera holder and electrically connected to the external device connector such that the camera, when mating with the camera connector, is connectable to the external device through the camera connector and the external device connector; and
   an electric charger electrically connected to the camera connector for charging the camera when the camera is mated with the camera connector;
   wherein the support comprises one of a recess and a cut adapted to receive therein the camera holder and the camera held by the camera holder in their entirety, such that when the support is moved to the lying position with the camera holder and the camera held by the camera holder received in their entirety in the recess or cut, the support is foldable against the foot in substantially a same plane.

2. The camera stand of claim 1, wherein the foot also functions as a picture/document rest for supporting a picture/document, and the support is supported rotatably at the second end by a rear end of the picture/document rest such that the support is movable between the upstanding position and the lying position where the support lies on the picture/document rest.

3. The camera stand of claim 2, wherein the picture/document rest comprises a rectangular central plate, the support being connected rotatably at the second end to the rectangular plate near a shorter side of the rectangular plate, and a pair of side plates each connected rotatably on one side to an adjacent longer side of the central plate such that the pair of side plates are extendible so as to share a same plane with the central plate and be foldable on the central plate; and
   wherein the support has substantially a same width as the central plate and is positionable on the pair of side plates when folded on the central plate.

4. The camera stand of claim 2, wherein the picture/document rest comprises a single plate that has substantially a same width as the support.

5. The camera stand of claim 1, wherein the foot is shaped like a rod and is adapted to be placed in a lying state on a surface, the foot being disposed on at least one of opposite sides of the support; and
   wherein the support is rotatably connected at the first end thereof to a rear end of the foot and is movable alongside the foot between the lying position in an extending direction of the foot and the upstanding position.

6. The camera stand of claim 5, wherein the foot has substantially a same thickness as the support.

7. The camera stand of claim 5, further comprising:
   a pivot extending horizontally and laterally from the rear end of the foot; and
   wherein the support is rotatably supported at the second end by the pivot and slidable along the pivot.

8. The camera stand of claim 5, wherein the foot is disposed at one of the opposite sides of the support, and the support is supported by cooperation of the first end thereof and the foot in the upstanding state on the surface.

9. The camera stand of claim 5, wherein a portion of the foot is provided at each of the opposite sides of the support.

10. The camera stand of claim 1, wherein the support comprises:
    a first support part having opposite ends at one of which the first support part is rotatably supported by the foot;
    a second support part having opposite ends and being provided on the first support part so as to be slidable in an extending direction of the first support part such that the second support part is extended outwards from the first support part in use and received within a length of the first support part when not in use; and
    wherein the arm mechanism has opposite ends at one of which the arm mechanism is rotatably connected to one end of the second support part and received when not in use along with the second support part within the length of the first support part.

11. The camera stand of claim 10, wherein the first support part comprises a hollow member having a hollow portion in which the second support part and the arm mechanism are received.

12. The camera stand of claim 11, wherein the arm mechanism is received within the length of the first support part with the digital camera left outside the first support part when held by the camera holder, and the digital camera is covered with a removable cap when held by the camera holder.

13. The camera stand of claim 1, wherein the arm mechanism comprises an arm supported rotatably at a first end to the second end of the support, and the camera holder is attached to a second end of the arm opposite to the first end of the arm such that the camera holder is inclinable at a desired angle to an extending direction of the arm.

14. The camera stand of claim 13, wherein the camera holder comprises:
    a turning member supported at the second end of the arm; and
    a camera fixing member removably attached to the turning member for removably supporting the digital camera.

15. The camera stand of claim 13, wherein the camera holder comprises:
    a turning member connected to the second end of the arm; and
    a camera fixing member rotatably attached to the turning member for removably supporting the digital camera thereon.

16. The camera stand of claim 13, wherein the camera holder comprises:
    a first turning member connected to the second end of the arm;
    a second turning member rotatably attached to the first turning member; and
    a camera fixing member removably attached to the second turning member for removably supporting the digital camera.

17. The camera stand of claim 1, wherein the arm mechanism further comprises:

an arm rotatably attached at a first end to the second end of the support, and wherein the camera holder is pivotably coupled to a second end of the arm.

18. The camera stand of claim 17, wherein the camera holder further comprises:
   a turning member pivotably coupled to the second end of the arm; and
   a camera attaching member removably attached to the turning member for removably supporting the digital camera.

19. The camera stand of claim 1, further comprising:
   a picture/document illumination light provided on one of the support and the arm mechanism for illuminating a picture/document being imaged by the digital camera when held by the camera holder; and
   a driver provided in the support for driving the illumination light.

\* \* \* \* \*

UNITED STATES PATENT AND TRADEMARK OFFICE
CERTIFICATE OF CORRECTION

PATENT NO.        : 7,626,634 B2
APPLICATION NO.   : 10/922277
DATED             : December 1, 2009
INVENTOR(S)       : Yuji Ohki Page 1 of 1

It is certified that error appears in the above-identified patent and that said Letters Patent is hereby corrected as shown below:

Column 11, line 11 (Claim 1, line 10: after the word "being" delete "D".

Signed and Sealed this
Twenty-fourth Day of May, 2011

David J. Kappos
*Director of the United States Patent and Trademark Office*